US006484932B1

(12) United States Patent
Kinney et al.

(10) Patent No.: US 6,484,932 B1
(45) Date of Patent: Nov. 26, 2002

(54) METHOD AND APPARATUS FOR COMMUNICATING ULTRAVIOLET (UV) RADIATION INFORMATION

(76) Inventors: John P. Kinney, 7422 Venetian Way, W. P. B., FL (US) 33406; Quintin D. Kinney, 5301 Bolsa Ave., Huntington Beach, CA (US) 92647

( * ) Notice: Subject to any disclaimer, the term of this patent is extended or adjusted under 35 U.S.C. 154(b) by 0 days.

(21) Appl. No.: 09/399,067

(22) Filed: Sep. 18, 1999

Related U.S. Application Data (60) Provisional application No. 60/127,703, filed on Apr. 9, 1999.

(51) Int. Cl.[7] ............................................. G06C 27/00
(52) U.S. Cl. ...................... 235/73; 235/78 R; 250/372
(58) Field of Search ................................ 235/73, 78 R; 250/338, 372

(56) References Cited

U.S. PATENT DOCUMENTS

| 4,704,535 A | 11/1987 | Leber et al. |
|---|---|---|
| 4,749,865 A | 6/1988 | Scheller |
| 4,818,491 A | 4/1989 | Fariss |
| 4,882,598 A | 11/1989 | Wulf |
| 5,008,548 A | 4/1991 | Gat |
| 5,036,311 A | 7/1991 | Moran et al. |
| 5,107,123 A | 4/1992 | Shi |
| 5,196,705 A | 3/1993 | Ryan |
| 5,365,068 A | 11/1994 | Dickerson |
| 5,382,799 A | 1/1995 | May |
| 5,576,551 A | 11/1996 | Adair |
| 5,686,727 A | 11/1997 | Reenstra et al. |

*Primary Examiner*—Karl D. Frech
(74) *Attorney, Agent, or Firm*—Gold & Rizvi, P.A.; Glenn E. Gold; H. John Rizvi (57) ABSTRACT

A method and corresponding display apparatus is provided for translating UV radiation data into pictorial symbols representing recommended protective measures for preventing diseases of the skin and eyes, and communicating the recommended measures to a target audience by means of the display apparatus. The display apparatus includes a rotatable disk member (70) positioned between a base member (60) and a template member (80). The disk member is rotated via tab (72) such that UV exposure information 75 appearing through template member window (82) always corresponds to appropriate protective measure pictorials (77) appearing through template member window (84).

16 Claims, 5 Drawing Sheets

METHOD AND APPARATUS FOR COMMUNICATING ULTRAVIOLET (UV) RADIATION INFORMATION

CROSS REFERENCES TO RELATED APPLICATIONS

This application claims the benefit of U.S. Provisional Application No. 60/127,703, filed Apr. 9, 1999.

FIELD OF THE INVENTION

This invention relates generally to a means for raising the awareness of the general public to the health risks associated with exposure to the sun, and more particularly to a method and apparatus for communicating UV radiation exposure information through pictorial representations.

BACKGROUND OF THE INVENTION

It has been well established that Ultraviolet (UV) radiation emanating from the sun poses a number of health risks to humans. In addition to causing burning, aging and wrinkling of the skin, exposure to the sun has been linked to a significant increase in the occurrence rate of skin cancer and cataracts in humans. Myriad personal sun protection devices aimed at providing the user with tanning information have been developed. For instance, U.S. Pat. No. 5,365,068 to Dickerson is representative of such devices. Dickerson discloses a portable device for calculating the optimal safe sun protection factor (SPF) lotion to be applied by the user under local ambient conditions, based upon user skin type and the amount of time the user desires to spend in the sun. These devices can be beneficial for providing individual users with important information for preventing damage to the skin. However, the aforementioned personal sun protection devices have a number of limitations. Significantly, because the devices are geared toward individual use, they are ineffective for communicating preventative information for educating the public at-large. Furthermore, such devices do not provide users with protective information prior to being exposed to the sun. Consequently, existing devices are ineffective for providing users with information for advance planning. Moreover, existing sun protection devices only provide users with limited preventative information, i.e., a recommended sun protection factor (SPF) lotion to apply.

The medical community has addressed the steady increase in UV radiation-related health problems by encouraging behavior modification aimed at protection from and avoidance of UV radiation exposure. Over the last decade, a number of countries have developed public awareness campaigns with limited success. In 1994, the United States Environmental Protection Agency (EPA) in conjunction with the National Weather Service (NWS) and Centers for Disease Control (CDC) developed and validated the UV Index, a daily prediction for the quantity of dangerous UV radiation impacting the largest population centers. More specifically, the UV Index is a calculated prediction of the amount of skin damaging UV radiation that will reach a specific location (1 $m^2$) during the solar noon hour, 11:30 a.m. to 12:30 p.m. (standard time). The variables considered in this prediction include: (1) latitude; (2) day of the year; (3) total ozone overhead; (4) elevation above sea level; and (5) amount of cloud cover. The EPA further categorizes the numerical UV index into five levels, from Minimal to Very High, further correlating the levels to appropriate protective actions for each. The effort has raised the visibility of the risks associated with prolonged exposure to UV radiation. However, while documenting the wide dissemination and usefulness of the UV index, surveys have also manifested an inconsistent understanding of its significance. In particular, there is a widespread lack of understanding of the Index's numerical value and how to correlate the value to determine appropriate sun protection measures.

It has been well-established that existing campaigns and devices have met with limited success, at best, in educating and arming the public with information for combating UV radiation-related health problems. Accordingly, there is a recognized need for a means of communicating sun protection information to the public in a more effective manner. In particular, it would be desirable to provide a means of effectively communicating specific recommended sun protection measures correlating to the UV Index.

SUMMARY OF THE INVENTION

It is an object of this invention to provide a means for raising the awareness of the general public to the health risks associated with exposure to the sun.

It is another object of this invention to provide a method for communicating specific sun protection measures to the public in a more effective manner.

It is a further object of this invention to provide an apparatus for communicating the aforementioned sun protection measures in the form of pictorials, based upon a particular UV Index value.

These and other objects are achieved with the present invention. The invention comprises a method for communicating specific measures for reducing UV radiation related health risks based upon a particular UV Index value or range at a particular locale. The invention further comprises various embodiments of an apparatus for carrying out the aforementioned method.

The method includes the steps of: (1) obtaining UV Index values for a particular locale; (2) determining appropriate protective measures for minimizing health risks, based upon the UV Index value obtained; and (3) communicating the protective measures in the form of pictorial images via a display apparatus.

An apparatus is provided for carrying out the method of the present invention. Preferably, the apparatus comprises a board assembly constructed from a weather-resistant material. Display elements having pictorial representations of recommended protective measures based upon a particular UV Index value or range are displayed through openings, or windows, strategically positioned on the board assembly.

In the referred embodiment of the invention the display assembly has a tri-layer construction, including a rotatable disk member positioned between a base member and a template member. The layers are interconnected at their centers by a mechanical subassembly such that the base and template members are maintained in a fixed position while the centrally-disposed disk member is rotated therebetween. The rotatable disk member preferably includes UV Index, time-to-burn, and protective measure information represented on a major surface. The template member includes strategically-positioned windows or openings for visually communicating said UV Index, time-to-burn, and protective measure information to a target audience.

In a first alternate embodiment of the present invention, numeric, alphanumeric, graphical and/or pictorial representations are provided on a plurality of individual disk members, or dials, attached to a display board in such a manner that, upon rotation of the dials, the desired information is displayed through a plurality of corresponding display board openings or windows. Furthermore, the individual disks can be constructed to engage one another in a gear-like fashion such that a given degree of rotation of a UV Index dial results in a corresponding desired degree of rotation of at least one other dial. For example, in this manner, the gears can engage one another such that UV Index values displayed through a UV Index window always correspond to appropriate protective measure pictorials displayed through a protective measures window.

In a second alternate embodiment of the invention, numeric, alphanumeric, graphical and/or pictorial representations are provided on individual board members for being visually communicated through display board windows or openings. In this second alternate embodiment, the individual board members can be manually inserted through slots along the periphery of the board such that the information intended to be communicated is visible through the display board openings or windows.

In a third alternate embodiment of the present invention, the apparatus comprises a base substrate and an overlying template member interconnected at their centers in such a manner that the base substrate is maintained in a fixed position, but the template member can be rotated about its center, i.e., about the interconnection. A first major surface of the base layer has numeric, alphanumeric, graphical and/or pictorial representations of UV-related information displayed thereon and positioned for viewing through openings formed in the template member. Preferably, an opposite second major surface of the base substrate is constructed for attachment to a mounting surface. It will be apparent to one skilled in the art that numerous means for mounting the present apparatus on a display surface are available. For example, the second major surface can be magnetized, thereby enabling the releasable attachment of the display assembly to a metal structure, such as a refrigerator. Alternatively, the second major surface can be coated with an adhesive for permanent attachment to any of a number of mounting surfaces, including a wall, the side of a truck and a billboard, to name just a few.

DETAILED DESCRIPTION OF THE PREFERRED EMBODIMENTS

The present invention provides a method for visually communicating specific protective measures aimed at reducing UV radiation related health risks based upon UV Index values at a particular locale, and a display assembly for implementing said method.

Figure 1:
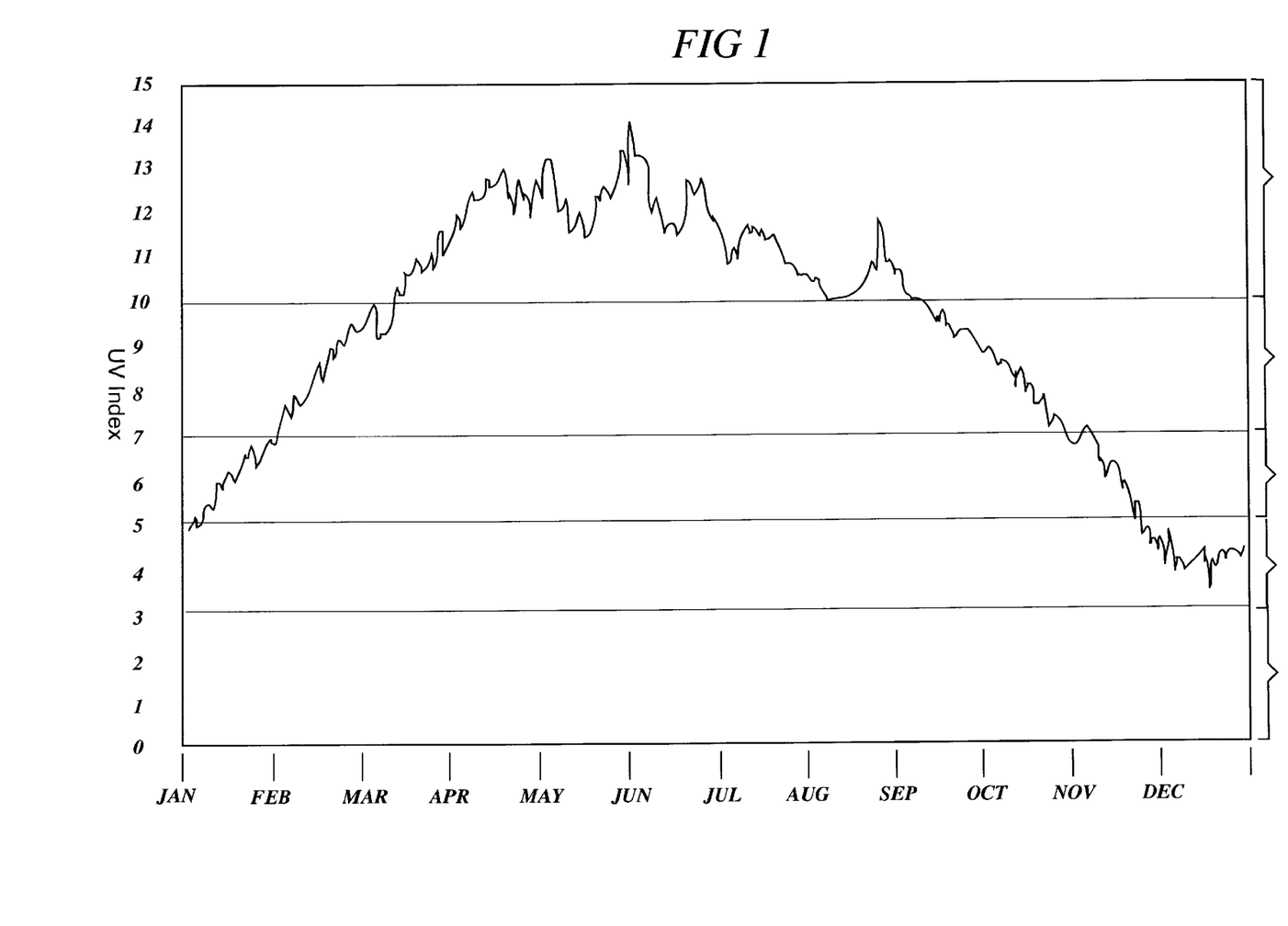
FIG. 1 is a graphical representation of UV Index data collected over a one-year period (1995) at a particular locale (Miami, Fla.)

Initially, a UV Index value or value range for a particular locale are obtained. Depending on the particular locale, Ultraviolet Index values can vary from day-to-day, and often vary greatly over the course of a year. As an example, the variation in UV Index values over a one-year period of time in Miami, Florida is graphically illustrated in FIG. 1. Ultraviolet Index forecasts are readily available for virtually all large population centers in the United States. For instance, UV Index values are made available daily by 4:00 p.m. for the following day via the National Weather Service (NWS) Weather Wire, and are published daily at the following internet sites: (1) the NWS UV Index home page (http:\\nic.noaa.gov/products/stratosphere/uv_index), and (2) the Interactive Weather Info. Network home page (http:\\iwin.nws.noaa.gov/iwin/us/ultraviolet.html). Moreover, local newspapers often purchase entire weather/meteorological maps and national temperature data from specialized companies. For example, Cox newspapers in South Florida purchases its meteorological data from Weather Central, Incorporated, and integrates the UV Index information into the weather format under the heading "Sun Danger." Other publications list this information under local "Sunburn Index" or "Ultraviolet Index" headings. UV radiation measurement devices that calculate UV Index are also available.

Based upon the particular UV Index value or range, specific protective measures are appropriate. As illustrated below in Table 1, standardized exposure levels (i.e., Minimal, Low, Moderate, High, and Very High) each correlating to a defined range of generally accepted UV Index values have already been established by the Environmental Protection Agency.

TABLE 1

EPA Exposure Level Classifications based upon UV Index.

| UV Index | EPA Exposure Level |
| --- | --- |
| 0–2 | Minimal |
| 3–4 | Low |
| 5–6 | Moderate |
| 7–9 | High |
| 10+ | Very High |

As further illustrated below in Table 2, each of these established ranges has been correlated to time-to-burn information and specific recommended protective measures established by the National Weather Service and the Environmental Protection Agency. For instance, a UV Index value of "4", defined as "Low" level UV Radiation, results in skin damage within about 15–20 minutes for a fair-skinned person, and correlates to suggested protective measures including wearing protective sunglasses, wearing a rimmed hat, and applying a protective sun screen lotion having a Sun Protection Factor (SPF) of at least 15.

TABLE 2

UV Exposure Levels, Skin Damage and Protective Measures

| UV Exposure | Minimal | Low | Moderate | High | V. High |
| --- | --- | --- | --- | --- | --- |
| UV Index | 0–2 | 3–4 | 5–6 | 7–9 | 10+ |
| Time-to-Burn (min) | | | | | |
| Fair Skin | 30 | 15–20 | 10–12 | 7–8.5 | 4–6 |
| Dark Skin | 120 | 75–90 | 50–60 | 33–40 | 20–30 |

TABLE 2-continued

UV Exposure Levels, Skin Damage and Protective Measures

| UV Exposure | Minimal | Low | Moderate | High | V. High |
|---|---|---|---|---|---|
| Protective Measures | | | | | |
| Rimmed Hat | ✓ | ✓ | ✓ | ✓ | ✓ |
| Sun Glasses | | ✓ | ✓ | ✓ | ✓ |
| Sun Screen | | SPF 15+ | SPF 15+ | SPF 30+ | SPF30+ |
| Seek Shade | | | ✓ | ✓ | ✓ |
| Avoid Sun (10am–4pm) | | | | ✓ | ✓ |

Preferably, the UV Index value, time-to-burn information, and pictorial representations of the specific recommended protective actions are visually communicated using a display apparatus in accordance with the present invention, as described in more detail hereinafter. For maximum effectiveness, it is preferable that the display apparatus of the present invention is positioned in a prominent location where it can be readily viewed by a target audience. The display apparatus for carrying out the method of the present invention is preferably portable and, in that sense, is adaptable for being transported to, and implemented at, virtually any venue, including parks, ski resorts, outdoor sports facilities, daycare centers, schools and construction sites, to name just a few. However, the invention is not intended to be so limiting. For instance, in alternate embodiments of the invention the display apparatus is designed to be permanently mounted on a fixed or stationary surface, such as a billboard.

Figure 2:
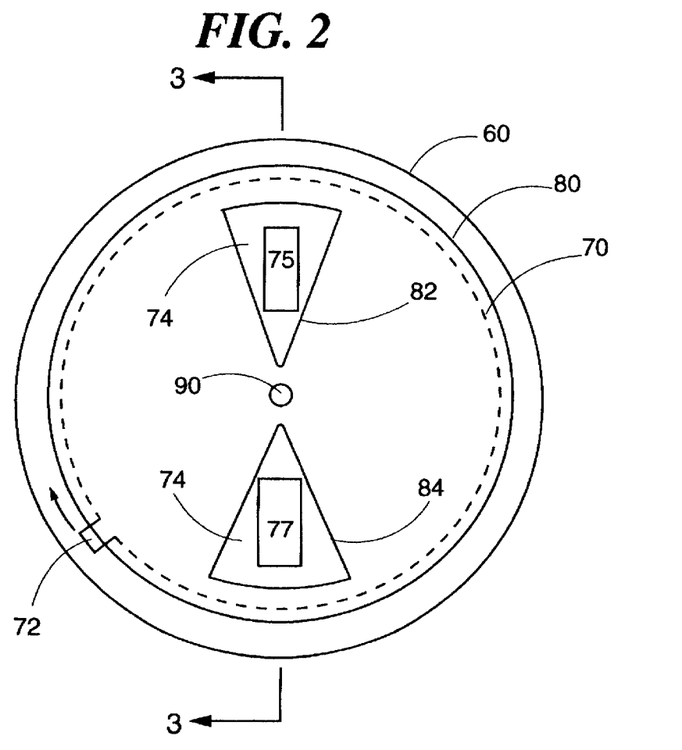
FIG. 2 is a front view of a display apparatus in accordance with a preferred embodiment of the present invention.
Figure 3:
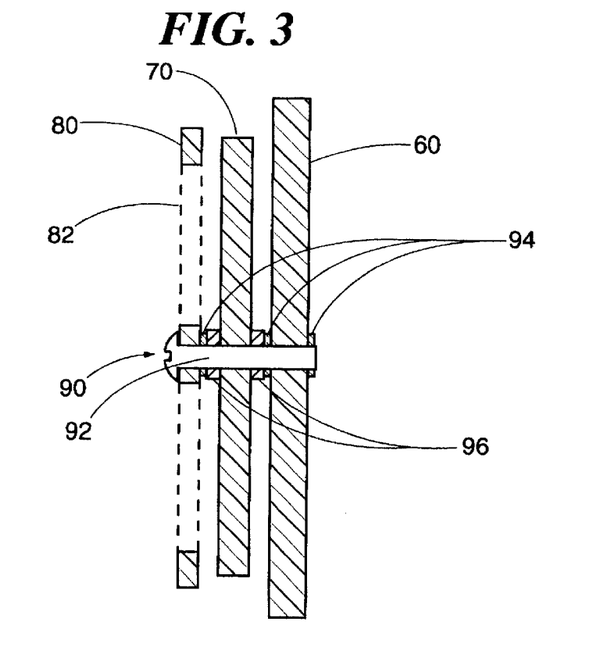
FIG. 3 is a side view in cross-section through 3—3 of the display apparatus in FIG. 2.

Referring now to FIGS. 2 and 3, a display apparatus is illustrated in accordance with a preferred embodiment of the present invention. Preferably, the display apparatus has a tri-layer construction comprising a rotatable disk member 70 positioned between a base member 60 and a template member 80. In instances where the apparatus is to be used in an outdoor environment, it is preferable that the apparatus is constructed of a water resistant material, such as plastic, to minimize weather-induced degradation. The base member 60, rotatable disk member 70, and template member 80 are interconnected via mechanical subassembly 90. Preferably, mechanical subassembly 90 includes a bolt 92, nuts 94, and washers 96. The bolt 92 is disposed through centrally-positioned apertures in each of the base, disk and template members. The nuts 94 maintain base member 60 and template member 80 in a fixed orientation with respect to one another, while preventing their rotation about bolt 90. Washers 96 are positioned on opposite sides of disk member 70, enabling its rotation about bolt 90 with minimal resistance. It will be apparent to those having ordinary skill in the art that mechanical subassembly 90 can take on myriad different embodiments without compromising the aforementioned intended functionality.

Surface 74 of rotatable disk member 70 has UV exposure information 75 and corresponding protective measure pictorials 77 disposed thereon. Preferably, UV exposure information 75 includes a UV Index value or range, and time-to-burn information. The time-to-burn information, which is an estimate of the safe time of exposure before the potential onset of skin damage, is preferably represented graphically or via a chart. Protective measure pictorials 77 include illustrations of a rimmed hat, sunglasses, a container of sun screen lotion (with an SPF number), a shade tree, and/or the face of a clock, as depicted in FIGS. 4 and 5.

Relevant UV exposure information and corresponding protective measure pictorials are strategically positioned on disk 70 such that the protective measures 77 visually exposed through opening or window 84 in template member 80 always correspond to the respective UV exposure information 75 visually exposed through opening or window 82 in template member 80. After obtaining the relevant UV Index, the user simply rotates disk member 70, via tab 72, until the relevant UV Index value is exposed through window 82; the corresponding pictorials 77 exposed through window 84 will accurately reflect the suggested protective measures which should be taken based upon the UV Index.

Figure 4:
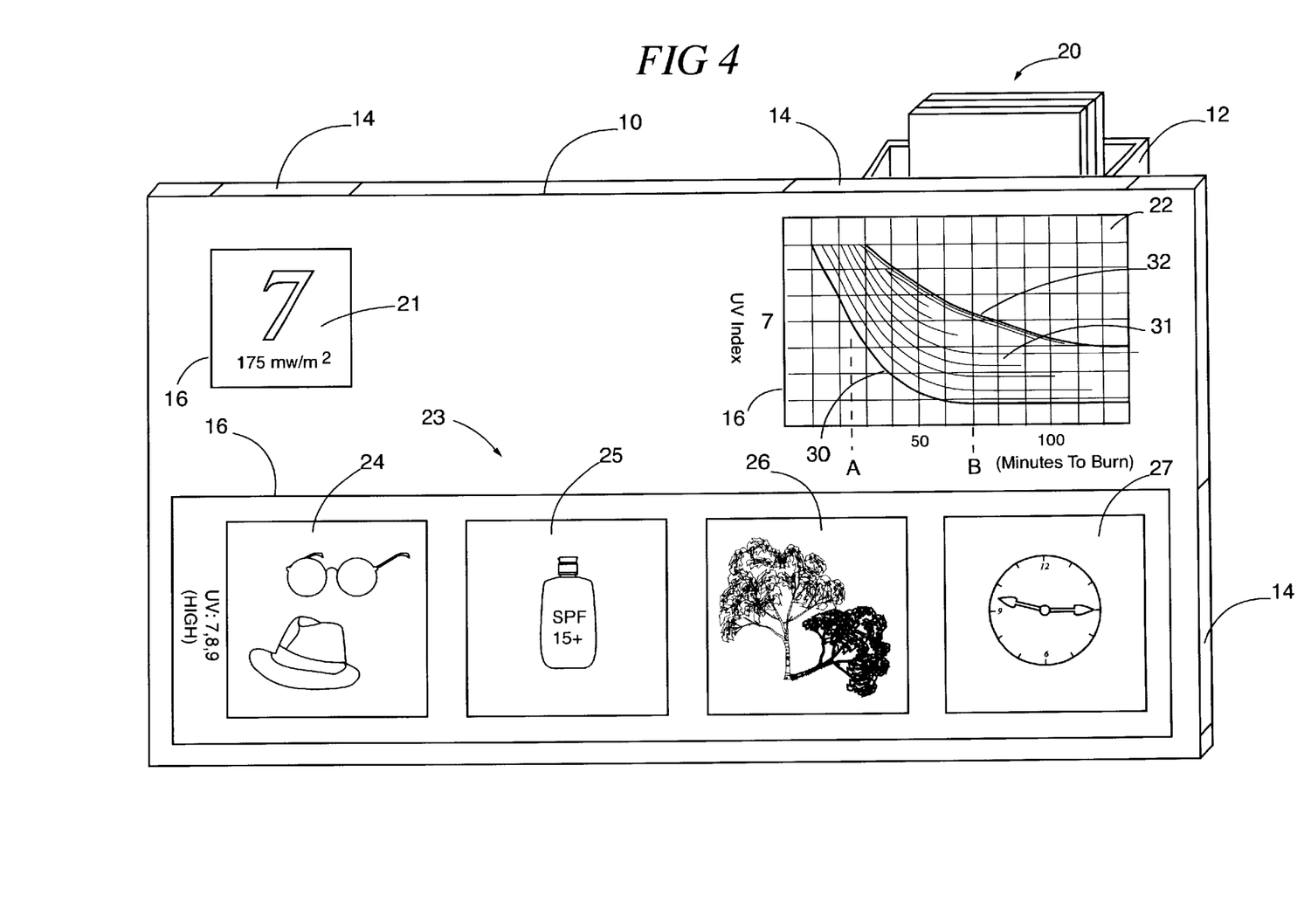
FIG. 4 is a perspective view of a display apparatus in accordance with an alternate embodiment of the present invention.
Figure 5:
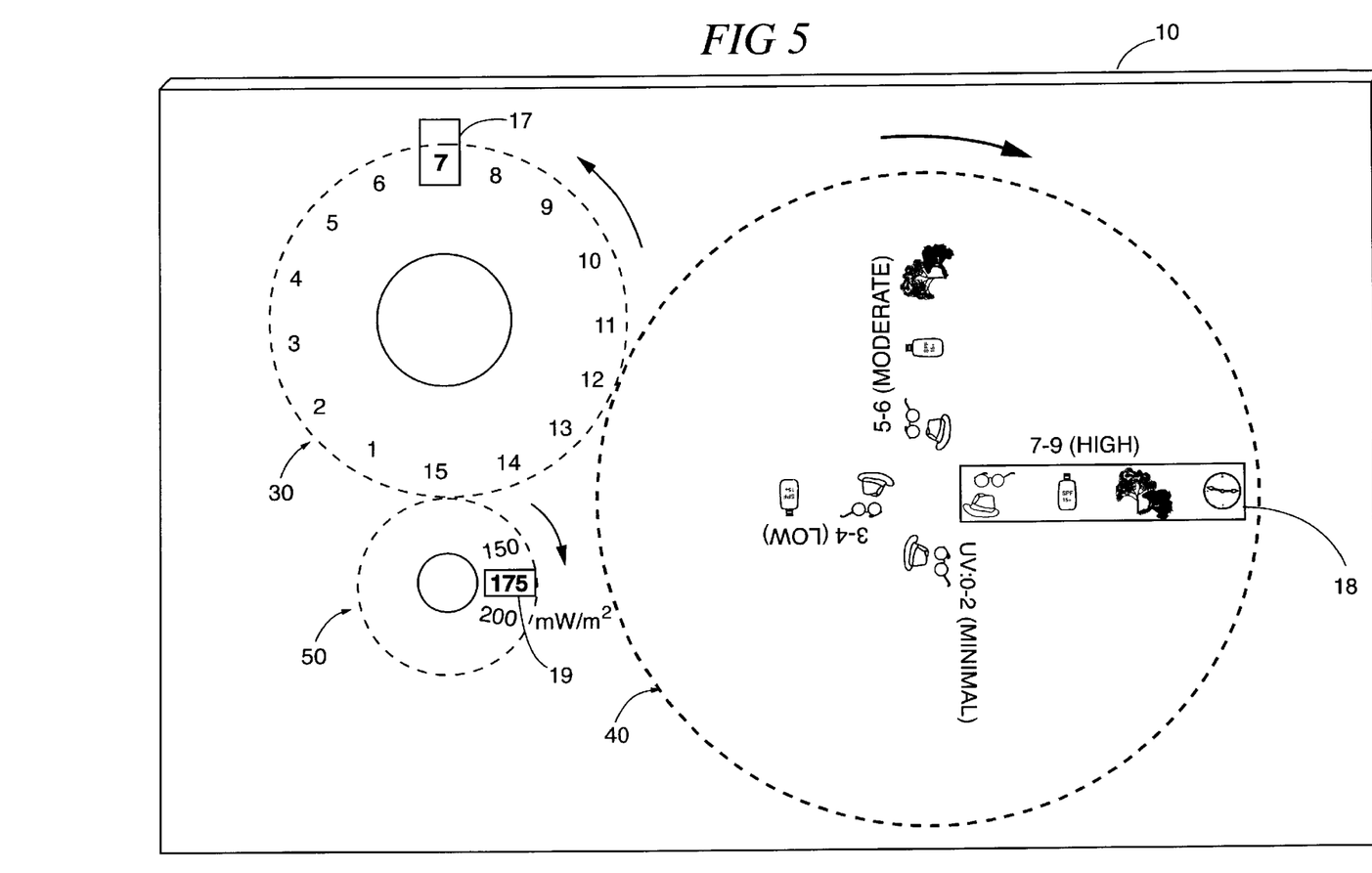
FIG. 5 is a perspective view of a display board in accordance with an alternate embodiment of the invention.

Referring now to FIG. 4, a display apparatus in accordance with an alternate embodiment of the present invention includes a display board 10 which is preferably constructed from a durable, weather-resistant material such as treated wood, metal, plastic, or some combination thereof. Display elements 21, 22 and 23, having alphanumeric, graphical, and/or pictorial representations of UV exposure information and recommended protective measures are inserted through slots 14 formed in the board for prominent display through display board windows or openings 16. Additional display elements 20 can be stored in a pocket 12 of the display board. Preferably, the display elements include a numerical representation of the UV Index 21 (including the corresponding UV power), a time-to-burn graph 22, and an insert 23 having pictorials 24, 25, 26, 27 representing the suggested protective measures or actions correlating to the UV Index value. The use of pictures for communicating protective measures is a significant benefit of the present invention. For instance, the pictorials enable the communication of the intended information to adults and children alike. Furthermore, the pictures do not require members of the target audience to have the ability to understand or comprehend a particular language. In that sense, the information desired to be communicated is represented in a universal language understandable by all members of a multi-cultural target audience.

Time-to-burn graph 22 preferably includes a shaded area 31 bounded by lines 30 and 32 representing most sensitive and least sensitive skin types, respectively. For instance, at a UV Index of 7, the minutes-to-burn for an individual with very sensitive skin would be represented by A, and the minutes-to-bum for an individual with the least sensitive skin would be represented by B. Preferably, area 31 contains graduated shading corresponding to skin color/tone.

Display element 23 includes a pictorial, or series of pictorials, identifying the recommended protective measure information. In FIG. 4, pictorial 24 suggests that individuals should wear a rimmed hat and protective glasses, pictorial 25 suggests the use of a protective sun screen lotion having a sun protection factor (or SPF) of at least 15, pictorial 26 suggests that individuals are advised to seek a shaded area, and pictorial 27 suggests that exposure to the sun should be completely avoided between the midday hours of 10:00 a.m. and 3:00 p.m. Preferably, the display elements are updated on a daily basis. For instance, where the board is displayed at a beach, a lifeguard or other beach worker would preferably update the board each morning based upon the particular UV Index for that locale on the particular day. As previously described, there are numerous sources for obtaining the UV Index on a given day, including newspapers and the Internet. Furthermore, measurement devices are available for calculating the UV Index.

It will be apparent to one skilled in the art that variations of this particular embodiment are possible without departing from the spirit and scope of the invention. For instance, in lieu of providing windows or openings in the display board, mounting or fastening means could be provided for temporarily mounting or attaching the display elements on the display surface of the board. For example, the display elements could be provided with holes for engaging hooks fastened to the board. Alternatively, frames could extend from the display surface for supporting the display elements.

Referring now to FIG. 5, in a further alternate embodiment of the invention alphanumeric, graphical and pictorial representations are provided on individual dials 30, 40, 50 attached to the display board 10. Upon rotating the dials, relevant information is displayed through respective openings or windows 17, 18, 19 of the display board. Alternatively, the peripheries of the display dials can be formed to engage one another, for example in a gear-like manner, such that a given degree of rotation of the UV Index dial 30 results in a corresponding desired rotation of the protective measure pictorial dial. Accordingly, this engagement results in the UV Index value displayed through the UV Index dial window 17 always corresponding to the appropriate protective measure pictorials displayed through the pictorial dial window 18. Consequently, the operator of the apparatus merely has to rotate the UV Index dial until the appropriate UV Index value appears through the UV Index dial window; the appropriate protective measures will automatically be displayed through the pictorial dial window.

Figure 6:
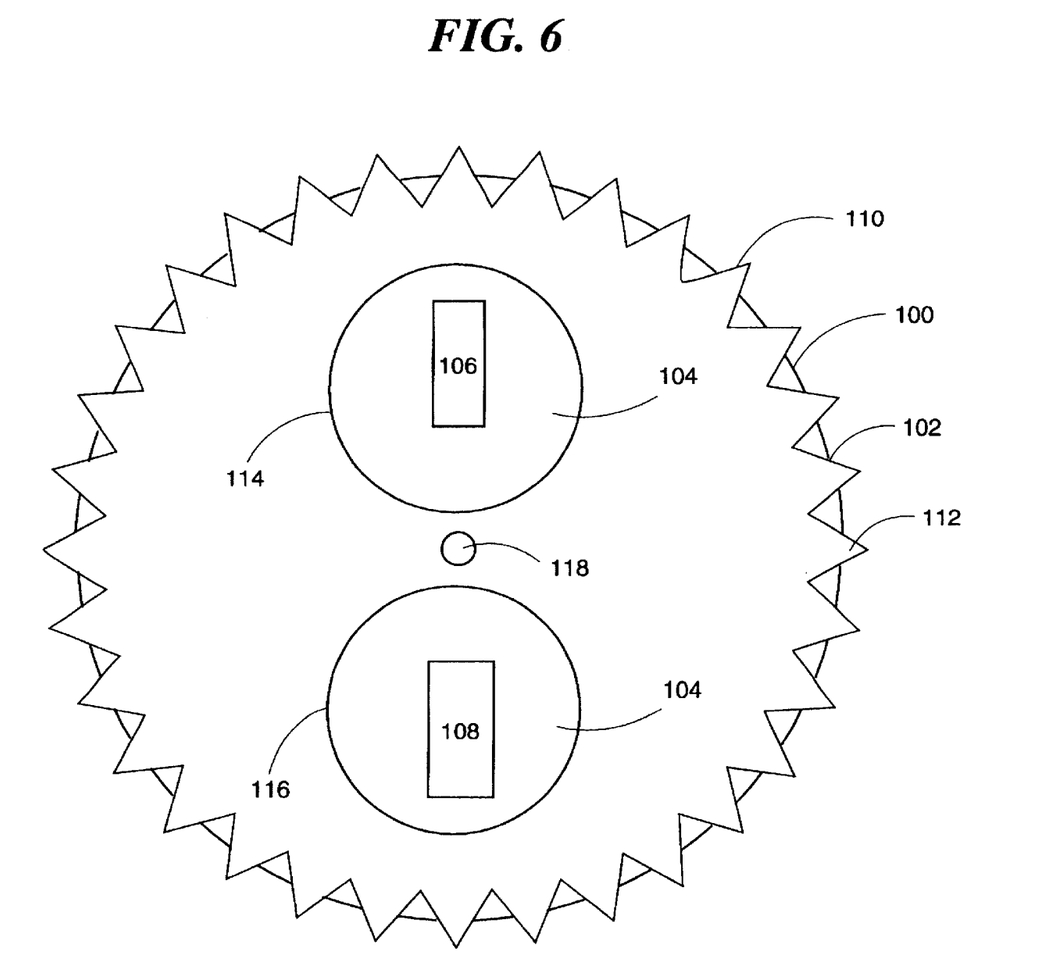
FIG. 6 is a front view of a display apparatus in accordance with an alternate embodiment of the invention.

Referring now to FIG. 6, in a further alternate embodiment of the invention a display assembly is provided having a template member 110 disposed directly atop, or overlying, a base layer 100 such that the base layer and template member have parallel planar orientations. More specifically, base layer 100 and template member 110 are interconnected at their centers by interconnect means 118, such that the template member can be rotated with respect to the base layer. It will be apparent to one skilled in the art that numerous types of mechanical interconnects or fasteners are available for providing the desired function of attachment while enabling rotation of template member 110 about base member 100, including rivets, screws and bolts, to name just a few.

A first major surface 104 of base layer 100 includes numeric, alphanumeric, graphical and/or pictorial representations of UV-related information 106, 108 positioned for viewing through openings 114, 116 in the template member. The overall size of the apparatus, as well as the materials used to construct the base and template members, can vary depending upon the particular application. For instance, a portable version of the apparatus intended for individual use as a reference device has dimensions on the order of inches and is preferably constructed from a relatively inexpensive material such as cardboard. At the other end of the spectrum, a larger version of the apparatus designed for mounting on a large surface area, such as a billboard, has dimensions on the order of feet and is preferably constructed from a weather-resistant plastic material such as a flexible vinyl sheet. An opposite second major surface 102 of the base layer 100 can be constructed for attachment to a mounting surface. For example, the second major surface can be magnetized for being releasably attached to a metal surface, such as the door of a refrigerator. Alternatively, the second major surface can be coated with an adhesive for permanent attachment to any of a number of mounting surfaces, including a wall, the side of a truck and a billboard, to name just a few.

In operation, template member 110 is rotated until UV exposure information 106, including a particular UV Index value or range, is visible through template opening 114. Corresponding protective measure pictorials 108 are strategically located on the base layer 100 such that the protective measure pictorials are simultaneously exposed through a second template opening 116.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as described in the claims.

We Claim:

1. A method for communicating protective measures for reducing ultraviolet radiation related health risks, the protective measures based upon a UV Index value, the method comprising the steps of:

providing a non-electronic display apparatus;

obtaining a UV Index value;

correlating said UV Index value to at least one corresponding protective measure; and displaying said at least one corresponding protective measure pictorially via said display apparatus.

2. A method as recited in claim 1, wherein the step of displaying further comprises displaying said UV Index value.

3. A method as recited in claim 1, wherein the step of displaying further comprises displaying human skin time-to-burn information.

4. A method as recited in claim 1, wherein the step of correlating further comprises rotating a template member until said UV Index value is visible through an opening in said template member.

5. A manual display apparatus for communicating protective measures for reducing ultraviolet radiation related health risks, comprising:

a base member;

a template member having at least one display window formed therein;

a rotatable disk member interposed between said base and template members, said rotatable disk member having ultraviolet exposure and corresponding protective measure information on a major surface thereof for viewing through said at least one display window; and an interconnect means disposed through centrally located openings in said base, template and rotatable disk members, said interconnect means preventing rotation of said base and template members while enabling rotation of said disk member about said interconnect means, wherein said display apparatus does not incorporate any electronic components and is operable by an individual through rotational manipulation of said interposed disk member.

6. A display apparatus as recited in claim 5, wherein said ultraviolet exposure information comprises numerical UV index values and pictorially-represented protective measure information.

7. A display apparatus as recited in claim 6, wherein said template member includes a first display window for visually communicating said UV index values and a second display window for visually communicating said protective measure pictorials.

8. A display apparatus as recited in claim 7, wherein said UV index values and said protective measure pictorials are positioned on said rotatable disk such that protective measure pictorials communicated through said second display window always correspond to the UV index value simultaneously communicated through said first display window.

9. A display apparatus as recited in claim 6, wherein said pictorial protective measure information includes at least one of a hat, a pair of sunglasses, and a container of sun screen lotion.

10. A manual display apparatus for communicating protective measures for reducing ultraviolet radiation related health risks, comprising:

a base layer having front and rear surfaces, the front surface having a plurality of UV index values and a plurality of protective measure pictorials displayed thereon;

a template member having at least one display opening formed therein, said template member positioned parallel to and above the front surface of said base substrate; and an interconnection means disposed through aligned and centrally-located apertures in said base substrate and template member, said interconnection means enabling rotation of said template member thereabout in a plane parallel to the front surface of said base layer, wherein said display apparatus does not incorporate any electronic components and is operable by an individual through rotational manipulation of said template member.

11. A display apparatus as recited in claim 10, wherein said template member has first and second display openings positioned such that the UV index value displayed through the first display opening always corresponds to protective measure pictorials simultaneously displayed through the second display opening.

12. A display apparatus as recited in claim 10, wherein the rear surface of said base substrate is constructed for releasable attachment to a mounting surface.

13. A display apparatus as recited in claim 12, wherein the rear surface of said base substrate comprises a magnetic surface.

14. A display apparatus as recited in claim 10, wherein the rear surface of said base substrate is constructed for being fixedly attached to a mounting surface.

15. A display apparatus as recited in claim 14, wherein the rear surface of said base substrate comprises a chemical adhesive.

16. A display apparatus as recited in claim 10, wherein said template member has at least one peripheral portion extending beyond the periphery of said base substrate for facilitating manual rotation thereof.

\* \* \* \* \*